United States Patent [19]
Clark, Jr. et al.

[11] 3,789,359
[45] Jan. 29, 1974

[54] SYNCHRONISM INDICATOR FOR A CONVOLUTIONAL DECODER

[75] Inventors: George Cyril Clark, Jr., Indialantic; Robert Curtis Davis, Melbourne Beach, both of Fla.

[73] Assignee: Harris-Intertype Corporation, Cleveland, Ohio

[22] Filed: Oct. 4, 1972

[21] Appl. No.: 294,768

[52] U.S. Cl. .......... 340/146.1 D
[51] Int. Cl. .......... G08c 25/00, H041 1/10
[58] Field of Search .......... 340/146.1 D; 178/69.5 R

[56] References Cited

UNITED STATES PATENTS 3,546,592 12/1970 Mayo .......... 340/146.1 D

*Primary Examiner*—Malcolm A. Morrison
*Assistant Examiner*—R. Stephen Dildine, Jr.
*Attorney, Agent, or Firm*—J. Herman Yount, Jr. et al.

[57] ABSTRACT

Apparatus for synchronizing a decoder of convolution codes with a received stream of convolutional code data. Synchronization is achieved with respect to such problems as bit polarity inversion and incorrect boundaries of branch intervals by examining a number of trial message sequences. The trial message sequences are obtained by an algorithm suggested by Viterbi involving selection of one survivor sequence terminating in each data state of the code. When the decoder is synchronized with the received data stream, the survivor data sequences are very probably all identical at a branch interval near the older-data end of the sequences. When the decoder is not synchronized, the survivor sequences, with high probability, differ from each other at that branch interval. Loss of synchronism is detected by simultaneously examining the survivor sequences at a branch interval located at a selected number L of branch intervals before the last-received data, L being less than or equal to the decoding depth. If the survivor sequences are not unanimous at depth L a count is registered. If the number of such counts occurring within a test period of B successive branch intervals exceeds a predetermined threshold T, branch synchronism is presumed to be incorrect and a search is initiated for correct synchronism.

9 Claims, 3 Drawing Figures

SYNCHRONISM INDICATOR FOR A CONVOLUTIONAL DECODER

BACKGROUND OF THE INVENTION

The present invention relates to the field of digital data codes and their correcting and decoding. Errors may be introduced into digital data by noise and other causes. If the code employed is a redundant type, occasional errors can be detected because they do not fit the context. Codes of the type involved here contain sufficient redundancy that a code message containing errors ordinarily can be corrected and accurately decoded. The present invention is a synchronism indicator for use with a decoder. The decoder is for correcting errors in such redundant data and decoding accurately the original message. The type of redundant codes to which the decoder and synchronism indicator are applicable are convolutional codes. They are characterized by the fact that when an original message is encoded the choice of code symbols selected to represent an input digit of the original message is affected not only by the input digit itself but also by a limited number of immediately preceeding input digits of the original message. Moreover, during decoding, the decoder's output depends upon its own past; this dependence extends to the infinite past, even though its dependence upon the input digits extends only to the limited number of input digits taken into account simultaneously by the encoder. Consequently, when the convolutional data is decoded to recover the original message, it is desirable to take into consideration a relatively long sequence of encoded digits before deciding upon a particular message digit as being the most probable original one.

The convolutional codes with which the present invention is concerned can be represented graphically in tree form. At the time of encoding, each bit of the original message causes the selection of one branch from among a plurality of branches emanating from a node, and a message of many successive digits can be represented graphically as a path through the tree. The tree spreads out very rapidly so that a very great number of different paths are possible even when a relatively short series of message digits or branch intervals is considered.

A further characteristic of convolutional codes is that every node in the tree can be classified as one of a relatively small number of possible "states" of the data. A data state is a code situation such that each possible sequence of further data immediately following that state is decoded in a particular predetermined manner. For example, every node which is classified as a state 2 node is a point from which subsequently received data should be decoded in exactly the same way as it would if that subsequently received data followed any other of the many state 2 nodes in the tree, irrespective of where they may be located in the tree. The same subsequently received data would be decoded differently if it followed another state, e.g., state 3, than it would when following a state 2. A path of a message through the data tree can therefore be represented as path through an array of data states. Possible data sequences can be represented more compactly in terms of states because a diagram of transitions among data states does not fan out as does the data tree. The data tree is said to coalesce into a data states diagram, which is referred to herein as a trellis diagram.

In decoding convolutional data, it is desirable to limit the number of trial data sequences whose correlations with the received data are computed and compared. An algorithm for selecting a limited number of promising survivor sequences has been suggested by A.J. Viterbi in "Error Bounds for Convolutional Codes and an Asymptotically Optimum Decoding Algorithm", I.E.E.E. Transactions on Information Theory, Volume IT-13 No. 2, Pages 260–269, April, 1967. Using the Viterbi algorithm the possible data sequences entering each state are considered and only one of the sequences entering each state is selected to serve as a trial sequence representing the state. The trial sequence which survives for each state is the one having the highest correlation with the received data of all of the sequences entering that state, but considering only those sequences which still survived after a similar selection was made to each of a number of preceding branch intervals. In accordance with the algorithm a comparison is next made among survivor sequences to ascertain which sequence is the most highly correlated with the data actually received. The sequence thus identified is assumed to be the sequence that was originally transmitted and is called the sole survivor sequence.

Decoding of message digits based upon this assumption is then carried out, however, only for the first one or first few received digits of the sequence. The entire sequence is not immediately decoded. Digits of the sequence following the first few digits are still subject to change on the basis of data to be received in the future when the entire process is repeated.

To summarize the Viterbi algorithm, data is not decoded as soon as it is received. Instead a sequence of data following the digit to be decoded is first collected, its length being called the decoding depth D. Then a limited number of possible messages are selected, each extending from the decoding depth, where the digit presently to be decoded is located, far into the more recently received data, with one such survivor sequence ending in each of the data states at the new-data end. A correlation between each survivor sequence and the data actually received is computed for the entire decoding depth under consideration. The highest-correlated of the survivor sequences is then selected to be the sole survivor sequence. The earliest received digit or digits within the decoding depth is then permanently decoded under the termporary assumption that the sole survivor sequence is the correct sequence.

For proper operation the decoder must have correct information as to the polarity of the received data stream. An undiscovered sign inversion makes the data unintelligible. Moreover the decoder must be in synchronism with the received data stream as to the time of beginning in the convolutional code of a new original message bit group. That is, the data boundaries of the branch must be known. Loss of branch synchronism of this type also makes the data meaningless to the decoder.

SUMMARY OF THE INVENTION

Apparatus is disclosed for obtaining branch synchronization of a decoder of convolutional codes when the decoding technique employed is based upon the referenced Viterbi algorithm or a similar technique. The synchronization method employed is to attempt to decode the received data in every bit position and with each polarity until synchronization is obtained, as indicated by some measure of reliability of the decoding decisions. In the invented equipment the measure of reliability relied upon is based upon a characteristic of the survivor sequences generated by decoders using the Viterbi or similar algorithms. With correct decoder synchronism, the survivor sequences are all, with high probability, identical near the old-data end of the sequences and do not diverge from each other except near the new data end. When, however, the decoder is not synchronized with the received data stream, the survivor sequences, with high probability, differ from each other even near the old-data end of the survivor sequences. The unanimity of the survivor sequences at a branch interval at some depth L (measured from the new-data end) which is less than or equal to the decoding depth D can therefore be used as an indication of synchronism. The indication is more reliable when the unanimity is found to occur at depth L for a time period long enough to include a succession of several branch intervals.

DESCRIPTION OF THE PREFERRED EMBODIMENT

Figure 1:
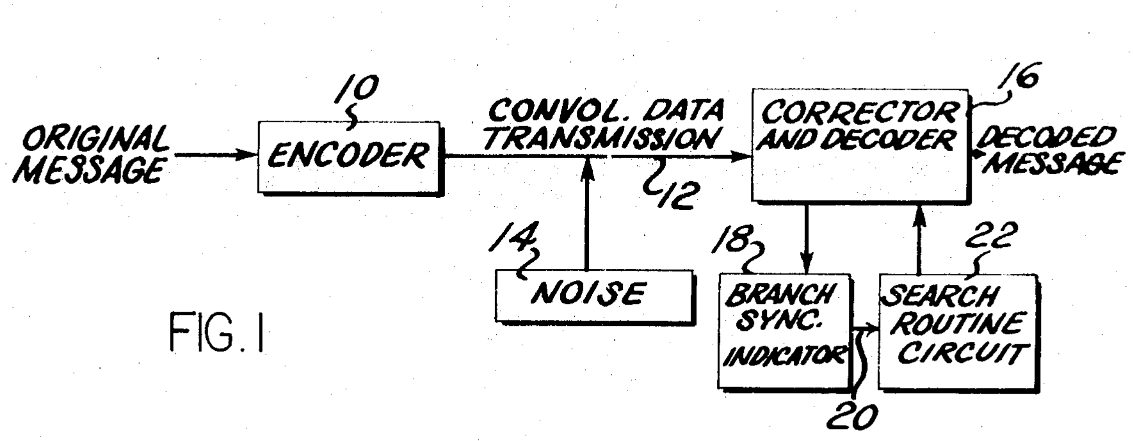
FIG. 1 is a block diagram of a digital data transmission system of one type to which the synchronizer is applicable.

An original message is redundantly encoded by a convolutional encoder 10, as shown in FIG. 1. The convolutional code data that is produced is then transmitted over a more or less noisy transmission channel 12, where it is affected by a source of noise 14. Instead of being transmitted, the data may in other situations be stored and later recovered, or in some other manner be subjected to a risk of introduction of errors into the data. The noise-corrupted data is received by a corrector and decoder 16 whose function is to recover the original message accurately by correcting the errors in the received data and decoding the message. The data may be decoded by decoding equipment described in detail in another application entitled Convolutional Decoder, Ser. No. 297,404 filed Oct. 13, 1972 by the same inventors. Alternatively, the data may be decoded in some other manner based upon the Viterbi algorithm or a similar process where a number of trial information sequences are retained.

Survivor sequences that are temporarily stored in the corrector and decoder 16 are examined by a branch synchronism indicator 18, which is the subject matter of this invention. The synchronism indicator 18 produces a signal at an output terminal 20 which indicates whether the decoder 16 is or is not in synchronism with the data stream received from data channel 12. If the signal at terminal 20 indicates lack of synchronism, a search for correct synchronism is initiated, under the control of a search routine circuit 22.

Figure 2:
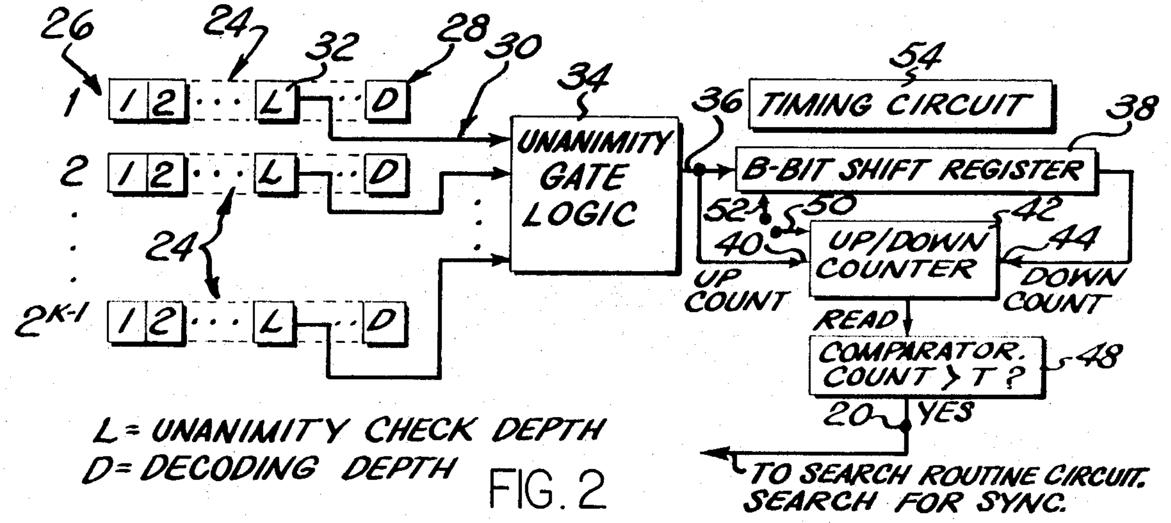
FIG. 2 is one form of the preferred embodiment of the invention using a shift register and an up-down counter for registering the instances of lack of unanimity.

One form of the preferred embodiment of the synchronism indicator 18 is shown in FIG. 2.

Survivor sequences are stored in $2K^{-1}$ data registers 24. Each of the registers 24 contains one trial information sequence of D branch intervals. Upon receipt of each new branch interval of data, all data in the shift registers 24 is shifted one stage, with new data entering the first stage and old data being discarded from the last stage. The more recently received data are in the lefthand stages 26 of the registers as they are depicted on FIG. 2, and the data which is currently being decoded, which is older data, are in the righthand ends 28. Stages denoted D contain data concerning which a decoding decision is currently to be made. At some depth L, as measured from the new-data end 26 of the registers, signals 30 are taken in parallel out of a stage 32 of each of the registers and connected to a logic circuit, shown as the unanimity gate logic 34 in FIG. 2. The unanimity gate logic circuit 34 produces a logic 0 output at its terminal 36 when all of its input signals 30 have the same logic symbol irrespective of what that symbol is. When the input data 30 are not unanimous the unanimity gate logic 34 produces a logic 1 at its output 36.

The output bits from the unanimity gate logic circuit 34 are fed into a B-bit shift register 38 and are also connected to an up-count input terminal 40 of an up-down counter 42. Each occurrence of a logic 1 bit from the unanimity gate logic circuit 34 increments the up-down counter 42 upwardly by one count. A data output of the B-bit shift register 38 is connected to a down-count input terminal 44 of the up-down counter 42. Each occurrence of a logic 1 bit at the output end of the B-bit shift register 38 decreases the stored count of the up-down counter 42 by one unit. The count in the up-down counter 42 is therefore the number of nonunanimous bit decisions for the preceding B branch intervals, that is, for the branch intervals whose nonunanimities are stored in the shift register 38. The contents of the up-down counter are compared with a threshold count T in a threshold comparator circuit 48. If the count in the up-down counter 42 exceeds T the decoder 16 is presumed to be out of synchronism with the data stream and a signal at terminal 20 is transmitted to the search routine circuit 22. A trial-and-error search is then initiated to regain the correct branch synchronism position and bit polarity.

At each trial position and polarity the foregoing test for reliability based on unanimity at the L depth is carried out, until synchronism is achieved. Several digits of convolutional code data represent each digit of original (uncoded) message data. At each trial position the decoder treats the incoming data stream as though a message bit interval starts and ends at particular places in the data stream. That is, various possible boundaries of convolutional code data groups are tried, to ascertain which boundaries correspond to the original message digits. In one mode of operation the grouping is changed only as newly received data arrive after discovering asynchronism. The search routine circuit 22 clearly falls within routine skill in the art. Search routine circuits have been used in the art; this invention does not require an understanding of them. The parameters B, L and T can be chosen to yield a very small probability that the count threshold will be exceeded when the decoder is operating in synchronism and yet yield a reasonably short synchronization acquisition time. The branch synchronism indicator 18 monitors the registers 24 and operates continuously so that a bit slippage or a phase inversion of the received data stream is detected quickly and a new search for branch synchronization is quickly initiated. The up-down counter 42 and the B-bit shift register 38 are set to zero at the start of each new attempt to synchronize by a signal applied to clearing terminals 50, 52. A timing circuit 54 controls the sequence of operations to carry out the procedure described above.

Figure 3:
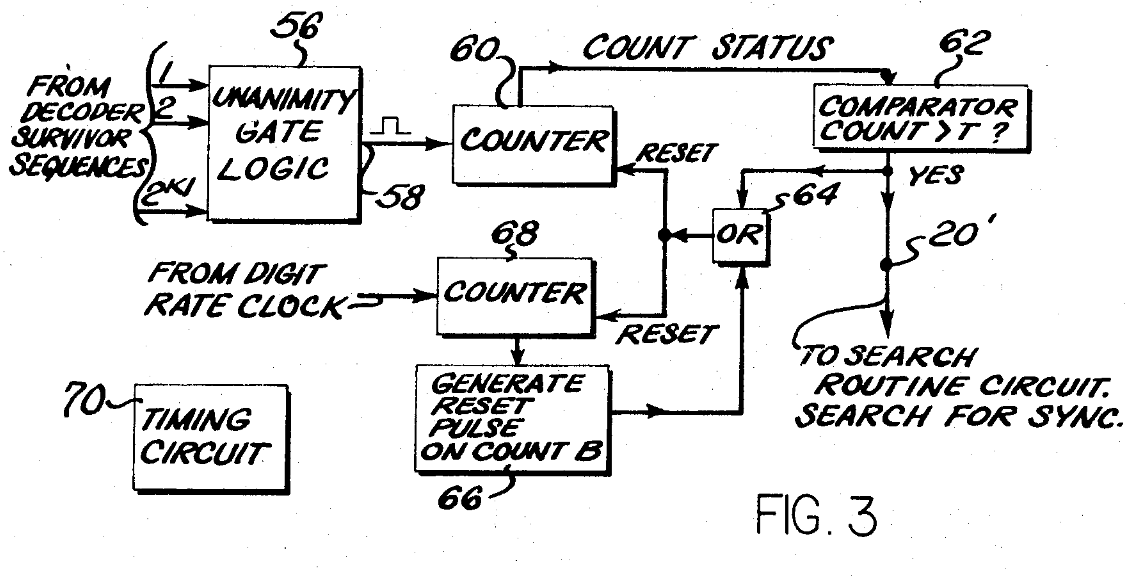
FIG. 3 is another form of the invention using two counters for measuring the degree of lack of unanimity.

Another form of the preferred embodiment is shown in FIG. 3. Unlike the form of FIG. 2 where a running count is maintained during synchronized operation, the circuit of FIG. 3 employs a block type of counting of nonunanimity events. The unanimity gate logic 56 in FIG. 3 monitors the survivor sequence registers at the L depth just as before, and produces a logic 1 at its terminal 58 for every occurrence of nonunanimity. The nonunanimous occurrences are counted in a counter 60, following a periodic reset of counter 60 to be described below. The status of the counter 60 is monitored by a threshold comparator 62 which continually determines whether or not the count in counter 60 exceeds a threshold T. If it does, the threshold comparator 62 produces a signal at its output terminal 20' which is transmitted to the search routine circuit 22 to intitate a search for correct branch synchronization. The output signal of the threshold comparator 62 also resets the counter 60 through an OR circuit 64.

Counter 60 can also be reset at the end of every group of B counts by a reset pulse generator 66 which operates under control of another counter 68. This occurs when synchronization is correct. Counter 68 counts every branch interval, irrespective of the findings of the unanimity gate logic 56. When a count B is achieved in counter 68, counter 68 causes the reset pulse generator 66 to reset both counter 68 and counter 60. Thus, counter 68 repeatedly counts from 0 to B at the message digit rate, and during each B-digit group, counter 60 counts the nonunanimous decisions detected by the unanimity gate logic 56. If, during a B-digit group, the count in counter 60 does not exceed T, the branch synchronization is presumed correct and the counters 60, 68 are reset to 0, after which the procedure is repeated. Timing circuits 70 control the sequence of operation. The technique of FIG. 3 tolerates a maximum of T nonunanimous digit comparisons in each set of B contihuous digits for the correct branch synchronism position.

The forms of the preferred embodiment described above are described in terms of a binary data code, but they may readily be generalized by those of ordinary skill in the art to other *q*-ary code systems.

What is claimed is:

1. A branch synchronism indicator for indicating whether or not a decoder is in synchronism with convolutionally encoded data which it receives in successive branch intervals, said decoder being of a type which upon each branch interval produces in an intermediate step of its decoding process a plurality of trial data sequences spanning a common group of branch intervals, said trial data sequences being characterized by a high probability of unanimity of data occupying a predetermined branch interval location within the span of the trial data sequences when the decoder is synchronized and by a low probability of unanimity of the data at said location when the decoder is not synchronized, comprising data register means for storing the data of at least said predetermined branch interval location of each of said trial data sequences, a logic circuit receiving input signals indicative of the data in said predetermined branch interval location for ascertaining whether or not said data are unanimous and for producing an output signal indicating either unanimity or nonunanimity, circuit means connected to receive said signals indicative of unanimity or nonunanimity for producing a signal if the rate of occurrence of the signals indicating nonunanimity exceeds a predetermined threshold, and timing means connected to said data register means, to said logic circuit, and to said circuit means for providing sequencing control signals cyclically repeating upon each successive branch interval.

2. A branch synchronism indicator as defined in claim 1 wherein said circuit means comprises counting means connected to receive said signals indicative of unanimity or nonunanimity for counting the signals of nonunanimity occurring within a first predetermined number of successive branch intervals and for registering the count, and wherein said circuit means further comprises a comparator for comparing said count from said counting means with a second predetermined number for producing a signal if the count exceeds said second predetermined number.

3. A branch synchronism indicator as defined in claim 2 wherein said counting means comprises a shift register having a number of data stages equal to said first predetermined number and having a register input and a register output, said register input being connected to receive said output signal from said logic circuit for shifting said output signal through said shift register upon successive branch intervals; and wherein said counting means further comprises a counter capable of counting up and down and registering a count, having an up-count input connected to receive said output signal from said logic circuit to increment the counter when said output signal indicates nonunanimity and having a down-count input connected to receive signals from said register output to decrement said counter upon a register output signal indicating nonunanimity, said counter being resettable to start with zero count and having an output connected to said comparator.

4. A branch synchronism indicator as defined in claim 2 wherein said counting means comprises a first counter connected to receive said output signal from said logic circuit for counting the output signals indicating nonunanimity and for outputting its count data to said comparator, a second counter for counting all successive branch intervals, and reset circuit means receiving count data from said second counter and responsive upon receiving a count equal to said first predetermined number to reset said first and said second counters, said reset circuit means being responsive moreover to occurrence of said signal produced by said comparator indicating that said count from said counting means exceeds said second predetermined number, to reset said first and said second counters.

5. A method of controlling an output apparatus in accordance with whether or not a decoder is in synchronism with convolutionally encoded data which it receives in successive branch intervals, said decoder being of a type which upon each branch interval produces in an intermediate step of its decoding process a plurality of trial data sequences spanning a common group of branch intervals, said trial data sequences being characterized by a high probability of unanimity of data occupying a predetermined branch interval location within the span of the trial data sequences when the decoder is synchronized and by a low probability of unanimity of the data at said location when the decoder is not synchronized, comprising the steps of: representing the data of at least said predetermined branch interval location of each of the trial data sequences as electrical signals, providing electronic data storage apparatus, storing in said data storage apparatus said electrical signals representing said data of at least said predetermined branch interval location of each of the trial data sequences, electrically comparing upon receipt of each branch interval the data at the predetermined branch interval location as to unanimity along the trial sequences to produce a signal indicating unanimity or nonunanimity, determining a rate of occurrence of the signals indicating nonunanimity in apparatus provided for that purpose, inanimately comparing the rate of occurrence of signals indicating nonunanimity with a predetermined threshold, automatically producing a signal indicating lack of synchronism when said rate of occurrence exceeds said threshold, and utilizing said signal indicating lack of synchronism to effect control of said output apparatus.

6. A method of controlling an output apparatus as defined in claim 5 wherein said step of determining a rate of occurrence comprises establishing a period consisting of a first predetermined number of successive comparisons of the data at said predetermined branch interval location, and counting the signals indicating nonunanimity occurring in said period, and wherein the step of comparing the rate of occurrence with a threshold comprises comparing the number of signals indicating nonunanimity occurring in said period with a second predetermined number, and wherein the step of producing a signal indicating lack of synchronism comprises producing a signal when said number of signals indicating nonunanimity exceeds said second predetermined number.

7. A method of controlling an output apparatus as defined in claim 6 wherein said step of establishing a period comprises establishing a running period in which upon receipt of each branch interval a new signal indicating unanimity or nonunanimity is included in said period and the oldest of such signals which was included in said period at an immediately preceding branch interval is omitted from said period.

8. A method of controlling an output apparatus as defined in claim 6 wherein said step of establishing a period comprises terminating a preceding block period and starting a new block period when the preceding block period achieves said first predetermined number or when said signal indicating lack of synchronism is produced, whichever occurs first.

9. A method as defined in claim 5 and wherein said step of utilizing said signal indicating lack of synchronism comprises the step of effecting the starting and stopping of automatic searching and synchronizing apparatus which searches for and establishes synchronism.

* * * * *

UNITED STATES PATENT OFFICE
CERTIFICATE OF CORRECTION

Patent No. 3,789,359 Dated January 29, 1974

Inventor(s) Geroge Cyril Clark, Jr., and Robert Curtis Davis

It is certified that error appears in the above-identified patent and that said Letters Patent are hereby corrected as shown below:

Column 7, line 14, "along" should be --among--.

Signed and sealed this 4th day of June 1974.

(SEAL)
Attest:

EDWARD M.FLETCHER,JR.
Attesting Officer

C. MARSHALL DANN
Commissioner of Patents